(12) United States Patent
Delerse et al.

(10) Patent No.: US 10,769,527 B2
(45) Date of Patent: Sep. 8, 2020

(54) ACCELERATING ARTIFICIAL NEURAL NETWORK COMPUTATIONS BY SKIPPING INPUT VALUES

(71) Applicant: Mipsology SAS, Palaiseau (FR)

(72) Inventors: Sebastien Delerse, Brétigny sur orge (FR); Ludovic Larzul, El Dorado Hills, CA (US); Benoit Chappet de Vangel, Paris (FR); Taoufik Chouta, Massy (FR)

(73) Assignee: Mipsology SAS (FR)

( * ) Notice: Subject to any disclaimer, the term of this patent is extended or adjusted under 35 U.S.C. 154(b) by 0 days.

(21) Appl. No.: 16/215,685

(22) Filed: Dec. 11, 2018

(65) Prior Publication Data

US 2020/0184328 A1 Jun. 11, 2020

(51) Int. Cl.

| | |
|---|---|
| *G06N 3/04* | (2006.01) |
| *G06N 3/02* | (2006.01) |
| *G06N 3/00* | (2006.01) |
| *G06F 7/04* | (2006.01) |
| *G06F 7/487* | (2006.01) |
| *G06N 3/063* | (2006.01) |
| *G06F 17/11* | (2006.01) |
| *G06N 3/08* | (2006.01) |
| *G06F 7/575* | (2006.01) |

(52) U.S. Cl.
CPC .............. *G06N 3/08* (2013.01); *G06F 7/575* (2013.01); *G06N 3/04* (2013.01)

(58) Field of Classification Search
CPC ............. G06N 3/08; G06N 3/04; G06F 7/575

USPC ........................................................ 706/1–62
See application file for complete search history.

(56) References Cited

U.S. PATENT DOCUMENTS

| | | | |
|---|---|---|---|
| 5,581,661 A | * 12/1996 | Wang ..................... | G06N 3/063 706/43 |
| 2017/0364477 A1 | * 12/2017 | Thach ..................... | G06F 7/588 |
| 2018/0121377 A1 | 5/2018 | Woo et al. | |
| 2018/0218518 A1 | 8/2018 | Yan et al. | |
| 2018/0225564 A1 | * 8/2018 | Haiut ..................... | G06N 3/049 |
| 2018/0276034 A1 | * 9/2018 | Henry .................... | G06F 9/4812 |
| 2018/0375480 A1 | * 12/2018 | Rollins .................. | H03F 1/3247 |
| 2019/0042922 A1 | * 2/2019 | Pillai ........................ | G06F 7/556 |
| 2019/0147327 A1 | * 5/2019 | Martin ..................... | G06N 3/063 706/15 |

* cited by examiner

*Primary Examiner* — Brandon S Cole
(74) *Attorney, Agent, or Firm* — Georgiy L. Khayet (57) ABSTRACT

Systems and methods for accelerating artificial neural network computation are disclosed. An example may comprise selecting, by a controller communicatively coupled to a selector and an arithmetic unit and based on a criterion, an input value from the stream of input values of a neuron, configuring, by the controller, the selector to provide, dynamically, the selected input value to the arithmetic unit, providing, by the controller to the arithmetic unit, an information of the selected input value, acquiring, by the arithmetic unit and based on the information, a weight from a set of weights, and performing, by the arithmetic unit a mathematical operation on the selected input value and the weight to obtain a result, wherein the result is to be used to compute an output of the neuron. The criterion may include a comparison between the input value and a reference value. The reference value may include zero.

18 Claims, 9 Drawing Sheets

ACCELERATING ARTIFICIAL NEURAL NETWORK COMPUTATIONS BY SKIPPING INPUT VALUES

TECHNICAL FIELD

The present disclosure relates generally to data processing and, more particularly, to system and method for accelerating artificial neural network computations.

BACKGROUND

Artificial Neural Networks (ANNs) are simplified and reduced models reproducing behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, each of the layers may include many neurons sharing similar functionality. The inputs of a layer may come from a previous layer, multiple previous layers, any other layers or even the layer itself. Major architectures of ANNs include Convolutional Neural Network (CNN), Recurrent Neural Network (RNN) and Long Term Short Memory (LTSM) network, but other architectures of ANN can be developed for specific applications. While some operations have a natural sequence, for example a layer depending on previous layers, most of the operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used which may involving excessive power consumption, a typical issue of GPUs. Since the GPUs may require more power consumptions for the computations of ANNs, the deployment of GPUs can be difficult.

To summarize, CPUs provide a very generic engine that can execute very few sequences of instructions with a minimum effort in terms of programming, but lack the power of computing for ANN. GPUs are slightly more parallel and require a larger effort of programming than CPUs, which can be hidden behind libraries with some performance costs, but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have being focusing on a specific ANN or a subset of ANNs, or requiring to modify the ANN structure to fit into a specific limited accelerator, or providing a basic functionality without solving the problem of computing ANN on FPGAs globally. The computation scale is typically not taken into account for existing FPGA solutions, many of the research being limited to a single or few computation engines, which could be replicated. The existing FPGA solutions do not solve the problem of massive data movement required at large scale for the actual ANN involved in real industrial applications. The inputs to be computed with an ANN are typically provided by an artificial intelligence (AI) framework. Those programs are used by the AI community to develop new ANN or global solutions based on ANN. FPGAs are also lacking integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for accelerating ANN computations.

According to one example embodiments, a system for accelerating ANN computation is provided. The system may include a controller, a selector communicatively coupled to the controller, and an arithmetic unit communicatively coupled to the controller and the selector. The controller can be configured to dynamically control the selection, based on a criterion, of an input value from a stream of input values of a neuron. The controller can configure the selector to provide dynamically the selected input value to the arithmetic unit. The controller can provide, to the arithmetic unit, information of the selected input value. The information may include an offset of the input value in the stream. The offset cannot be statically computed before the computation of the neuron since the input values in the stream can be generated as a result of previous neuron computation. The arithmetic unit can be configured to acquire, based on the offset, a weight from a set of weights. The arithmetic unit can further perform a mathematical operation on the selected input value and the weight to obtain a result to be used in computing an output of the neuron.

The mathematical operation performed by the arithmetic unit in its simplest form may include a multiplication product. The criterion applied by the controller may include comparison of the input value to a reference value. The comparison may include an equality comparison to zero. The comparison may also include a more-than comparison to a threshold.

The selector may include a multiplexer. The selector may also include an information related to a memory address. Input values not selected from the subset of input values are not provided to the arithmetic unit, therefore, a count of mathematical operations performed by the arithmetic unit on selected input values from the subset of input values is less than a count of mathematical operations required to be performed by the arithmetic unit on all input values from the subset of the input values.

According to another example embodiment, a system for realigning streams of neuron outputs is provided. The system may include an arithmetic unit, at least one further arithmetic unit, and a synchronization module communicatively coupled to the arithmetic unit and the further arithmetic unit. The arithmetic unit can generate a stream of neuron outputs and the further arithmetic unit can generate a further stream of further neuron outputs. The synchronization module can receive the stream of neuron outputs from the arithmetic unit and the further stream of further neuron outputs from the further arithmetic unit. The stream of the neuron outputs and the stream of further neuron outputs can be unaligned with respect to each other. The synchronization module can dynamically reorder the neuron outputs and the further neuron outputs to obtain an ordered sequence.

Reordering may include positioning an i-th neuron output from the stream before an i-th further neuron output from the further stream for i=1, ... , N, wherein N is a number of neuron outputs in the stream.

The synchronization module can write the ordered sequence to a local or global memory storage. The ordered sequence can be used as further input values for further computations required by the ANN.

The neuron outputs can be computed by the arithmetic unit based on first input values. The first input values can be selected from a stream of input values. The further neuron outputs can be computed by the further arithmetic unit based on second input values. The second input values can be selected from the further stream of further input values. A count of the input values in stream can be equal to a count of further input values in the further stream. First indexes of the first input values in the stream of input values can be different from second indexes of the second input values in the further stream of further input values. The difference in the first indexes and the second indexes may cause either an i-th neuron output in the stream of the neuron outputs to be generated substantially prior to an i-th further neuron output in the further stream of further neurons or the i-th neuron output in the stream to be generated substantially after the i-th further neuron output in the further stream for at least one of i=1, ... , N, wherein N is a number of neuron outputs in the stream.

According to yet another example embodiment, a method for accelerating ANN computation is provided. The method may further include dynamically selecting, by a controller communicatively coupled to a selector and an arithmetic unit and based on a criterion, an input value from a stream of input values of a neuron of ANN. The method may include dynamically configuring, by the controller, the selector to provide the selected input value to the arithmetic unit. The method may include dynamically providing, by the controller to the arithmetic unit, an offset of the selected input value. The method may include dynamically acquiring, by the arithmetic unit and based on the offset, a weight from a set of weights. The method may further include performing, by the arithmetic unit a mathematical operation on the selected input value and the weight to obtain a result, wherein the result is to be used to compute an output of the neuron.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are concerned with methods and systems for acceleration of ANN computations. Embodiments of present disclosure may facilitate selection of input values for processing by neurons of an ANN in order to avoid unnecessary mathematical operations in computation of outputs of neurons and, thereby, accelerating of computations of the ANN. In one example embodiment, the input values equal to zero are not processed by arithmetic units configured to compute the neurons of ANN. The selection of input values can be also based on another criterion. The sequence of operations performed by the arithmetic units may depend dynamically on the stream of input values and the criterion used for selection. For example, a select-all (no selection) criterion would result in an identical sequence of operations for all inputs, wherein essentially all operations of the neurons (and ANN) are performed. In this case the computation of ANN will be similar to ANN computations in existing solutions which do not expose a dynamic behavior.

While some embodiments of the present disclosure are described herein in reference to operations of FPGAs, the present technology may be also practiced with application-specific integrated circuits (ASICs), programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, application-specific integrated circuits (ASICs), programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, module may also refer to a subpart of a computer system, a hardware device, an integrated circuit, or a computer program.

Technical effects of certain embodiments of the present disclosure can include configuring integrated circuits, FPGAs, or computer systems to perform ANN computations without execution of redundant and unnecessary mathematical operations, thereby accelerating the ANN computations. Further technical effects of some embodiments of the present disclosure can facilitate configuration of integrated circuits, FPGAs, or computer systems to dynamically qualify data on which mathematical operations are to be performed in the ANN computations. Yet further technical effects of embodiments of the present disclosure include configuration of integrated circuits, FPGAs, or computer systems to dynamically align results of neuron computations performed in parallel by multiple processing units.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
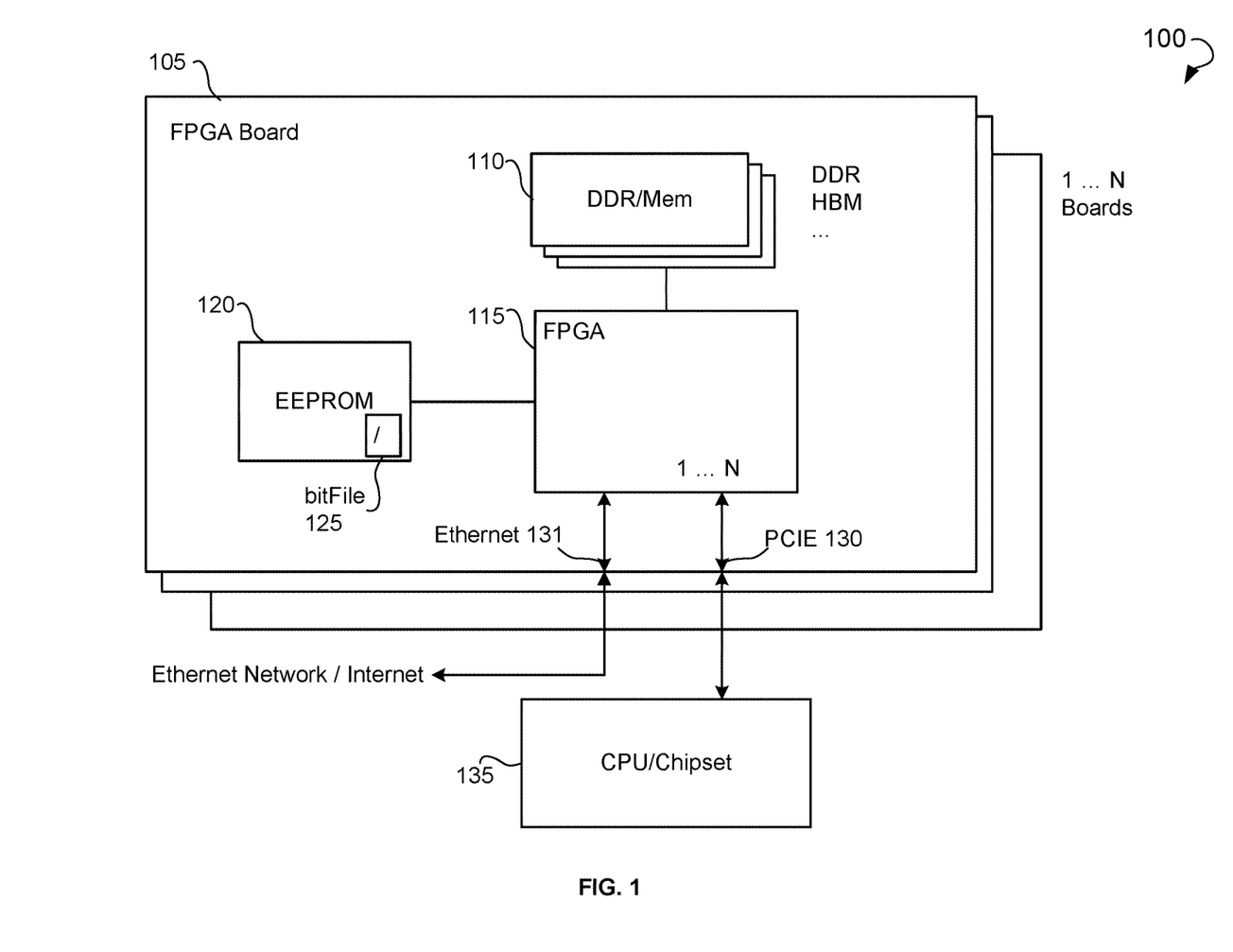
FIG. 1 is a block diagram showing an example system wherein a method for acceleration of ANN computations can be implemented, according to some example embodiments.

FIG. 1 is a block diagram showing an example system 100, wherein a method for accelerating ANN computation can be implemented, according to some example embodiments. The system 100 can be part of a computing system, such as a personal computer, a server, a cloud-based computing recourse, and the like. The system 100 may include one or more FPGA boards 105 and a chipset 135 including a least one CPU. The chipset 135 can be communicatively connected to the FPGA boards 105 via a communication interface. The communication interface may include a Peripheral Component Interconnect Express (PCIE) standard 130. The communication interface may also include an Ethernet connection 131.

The FPGA board 105 may include an FPGA 115, a volatile memory 110, and a non-volatile memory 120. The volatile memory 110 may include a double data rate synchronous dynamic random-access memory (DDR SDRAM), High Bandwidth Memory (HBM), or any other type of memory. The volatile memory 110 may include the host memory. The non-volatile memory 120 may include Electrically Erasable Programmable Read-Only Memory (EE-ROM), a solid-state drive (SSD), a flash memory, and so forth.

The FPGA 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations, for example, additions and multiplications. Programming of FPGA 115 may include configuring each of the blocks to have an expected behavior and connecting the blocks by routing information between the blocks. Programming of FPGA 115 can be carried out using a result from a compiler taking as input schematic description, gate-level description, hardware languages like Verilog, System Verilog, or Very High Speed Integrated Circuit Hardware Description Language (VHDL), or any combination of thereof.

The non-volatile memory 120 may be configured to store instructions in a form of bit file 125 to be executed by the FPGA 115. The FPGA 115 can be configured by the instructions to perform one or more floating point operations including multiplication and addition to calculate sum of products that can be used in neural network computations.

The volatile memory 110 may be configured to store weights W[i] for neurons of one or more ANNs, input values V[i] to be processed for the ANNs, and results of ANNs computation including any intermediate results of computations of layers of the ANNs.

Figure 2:
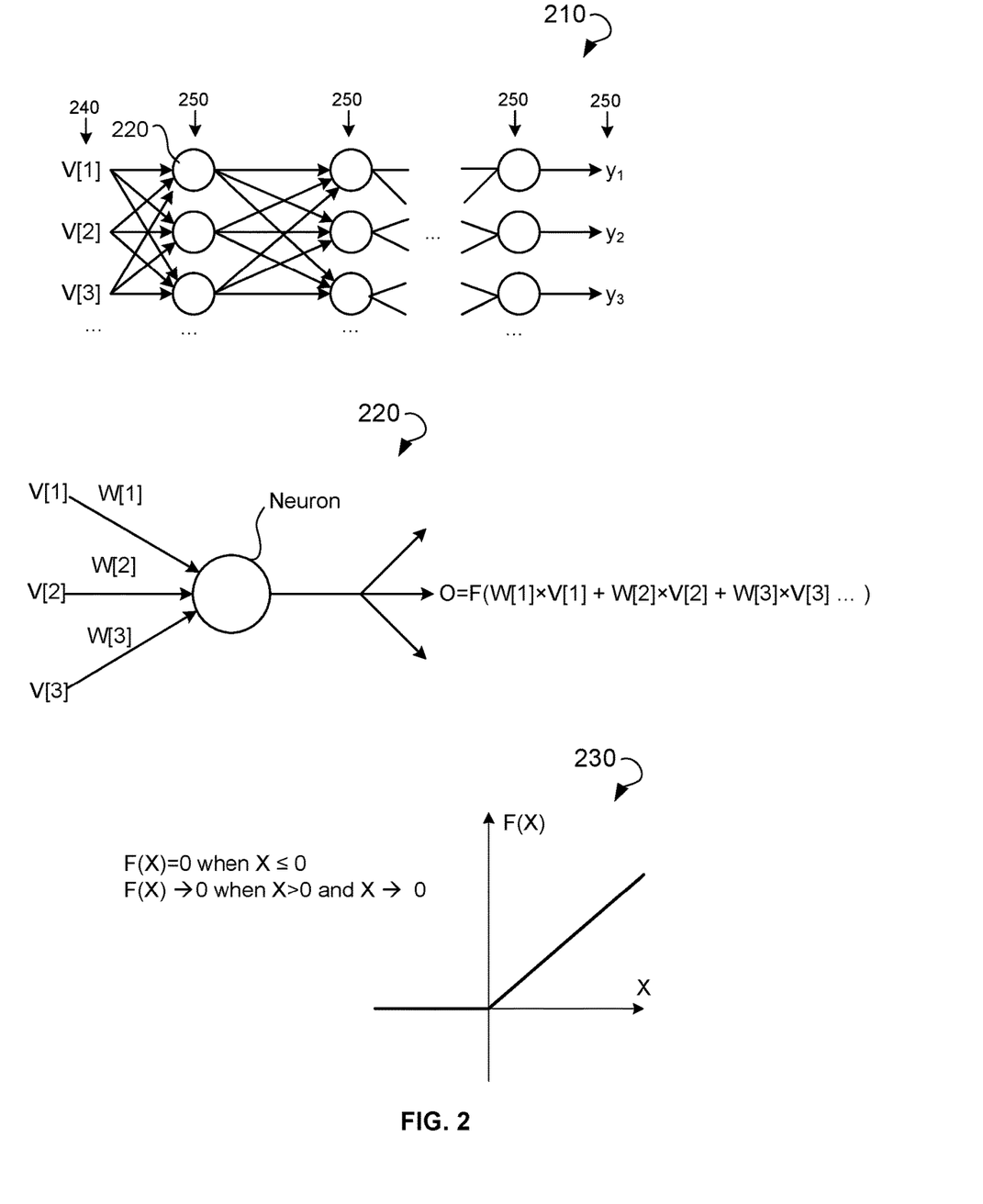
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may represent a calculation of a mathematical function $$O = F\left(\sum_{i=1}^{n} V[i] \times W[i]\right) \quad (1)$$

wherein V[i] are neuron input values, W[i] are weights assigned to input values at neuron, and F(X) is a transfer function. Typically, the transfer function 230 F(X) is selected to be zero for X<0 and have a limit of zero as X approaches zero. For example, the transfer function F(X) can be in the form of a sigmoid. The result of calculation of a neuron propagates as an input value of further neurons in the ANN. The further neurons can belong to either a next layer, a previous layer or the same layer.

It should be noted that while the ANN 210 illustrated in FIG. 2 can be referred to as a feedforward neural network, embodiments of the present disclosure can be also used in computations of convolution neural networks, recurrent neural networks, long short-term memory networks, and other types of ANNs.

Figure 3:
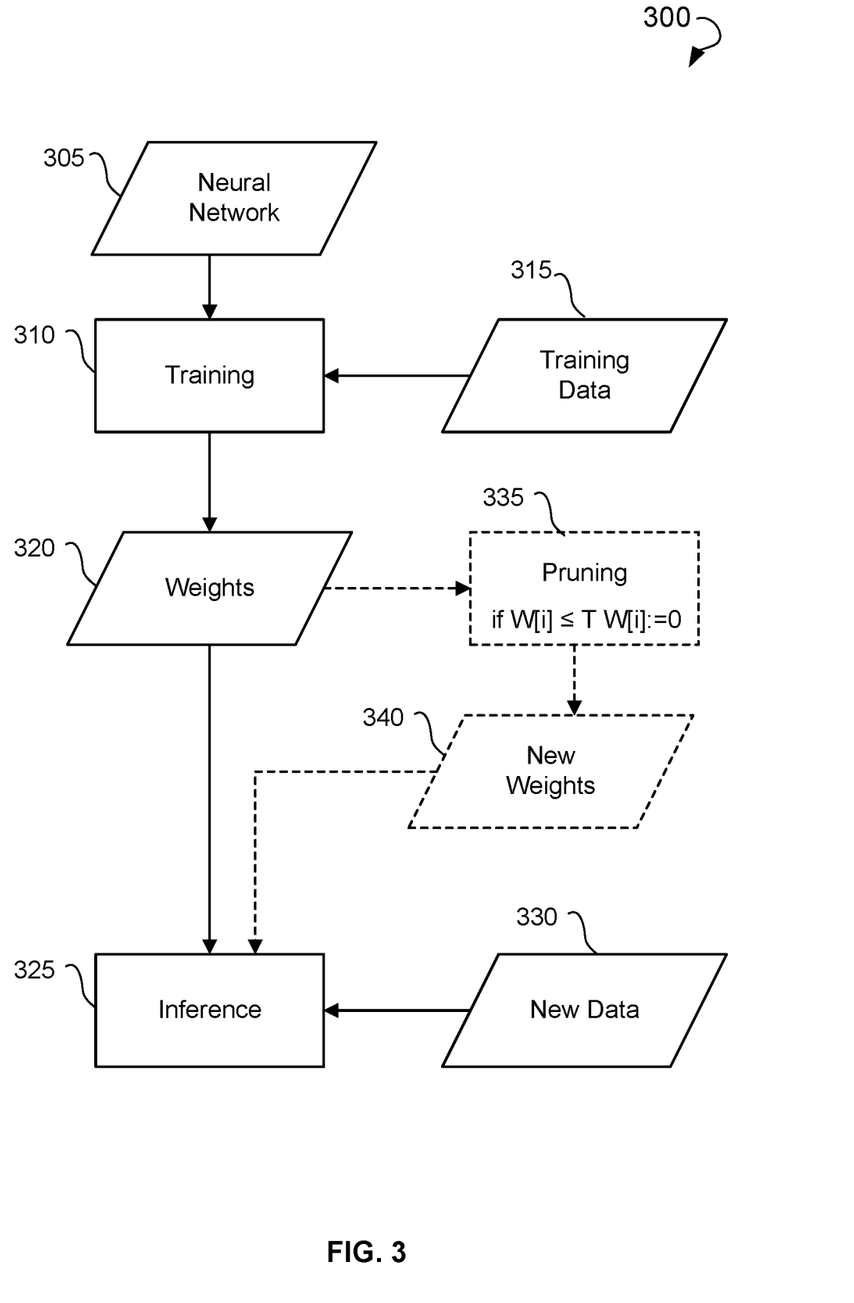
FIG. 3 is a flow chart showing training and inference of ANN, according to some example embodiments.

FIG. 3 is a flow chart showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answer the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, number of inferences can be large because new images can be received from billions of sources.

The inference 325 includes multiple computations of sum of products:

$$\sum_{i=1}^{n} V[i] \times W[i] \quad (2)$$

wherein the V[i] are new input values and W[i] are weights associated with neurons of ANN. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. Advantage of these approaches is that replacing the weights with zero values may allow decreasing the number of computations of the ANN, since multiplications by zero can be avoided in computations. The disadvantage of these approaches is that the ANN can become less accurate in producing a correct output due to lack of correspondence between the new weights 340 and training data 315 used in training of ANN. Another disadvantage of these approaches is that the pruning of weights is not based on new input values and allow only to avoid operations with weights equal to zero.

In contrast to previous approaches, in some embodiments of the present disclosure, the weights 310 may remain unchanged in inference 325, while multiplication by zero can be avoided by inspecting input values V[i]. Multiplications V[i]×W[i] are not carried out if a predetermined criterion is satisfied with respect to input value V[i]. For example, multiplication V[i]×W[i] can be skipped if the input value V[i] is substantially zero. In some other embodiments of the present disclosure, the criterion used to select the operations to be done may be different from a comparison to zero and, thereby, allowing to avoid other operations dynamically based on the input values V[i] and other values, for example, static values including weights. Thus, in contrast to previous approaches, embodiments of present disclosure allow dynamic selection of operations to be performed.

Figure 4:
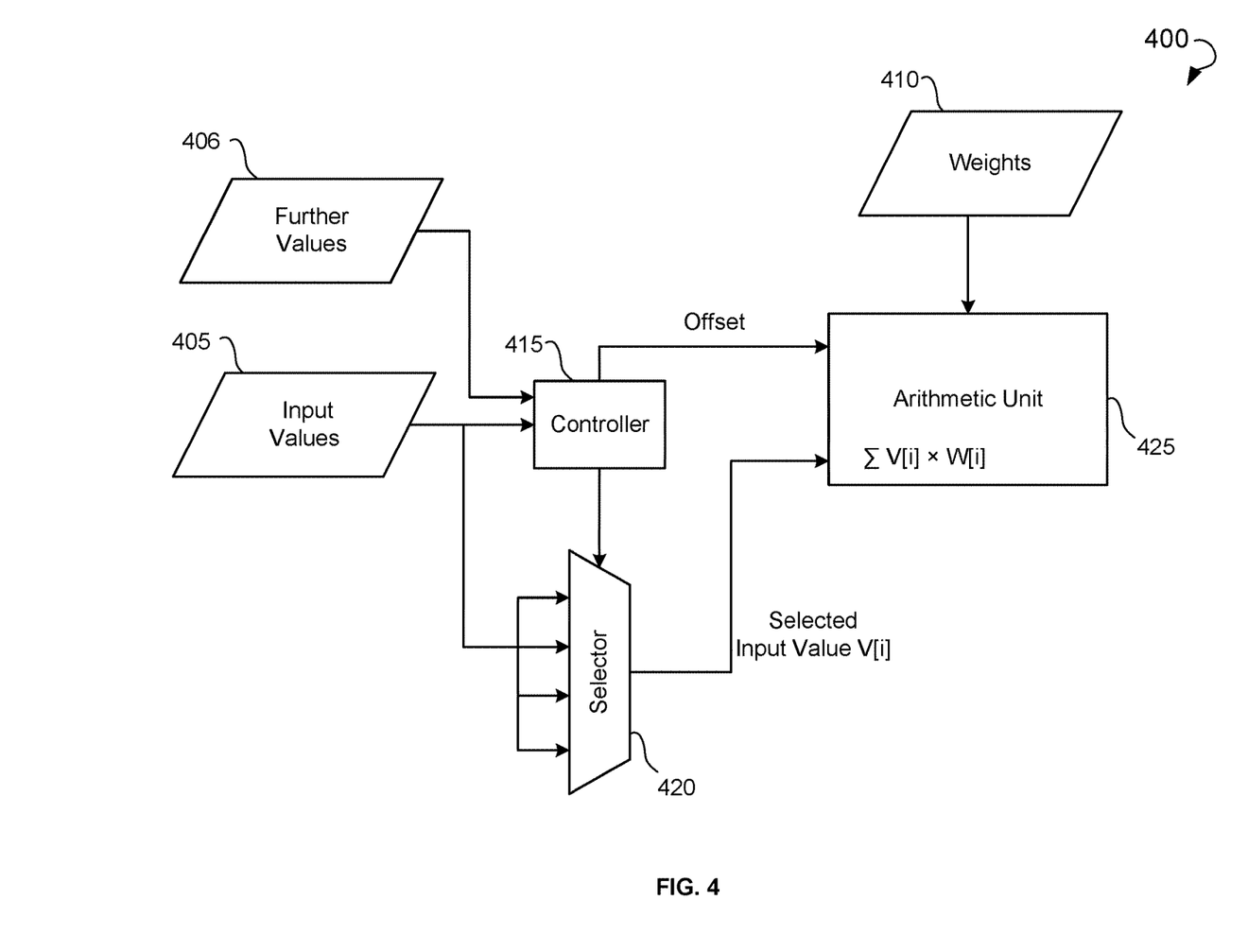
FIG. 4 is a block diagram showing a system for acceleration of ANN computations, according to some example embodiments.

FIG. 4 is a block diagram showing a system 400 for accelerating ANN computation, according to some example embodiments. The system may include an arithmetic unit 425, a controller 415, and a selector 420.

The controller 415 may receive a set $\{V[i_0], V[i_1], \ldots, V[i_{x-1}]\}$ of X input values of data 405. The controller 415 may optionally receive further input values 406 which are different from the input values 405. The further input values 406 can be related to the neuron, the layer, the ANN, the weights, the operation to be carried or any other kind of values. The controller 415 may provide, based on the input values 405 and the further values 406, an indication to the selector 420 as to which of the X input values are to be selected in the stream. The controller 415 may also provide, to the arithmetic unit 425, an offset or an index or bit enables of one or multiple selected value(s) in the set $\{V[i_0], V[i_0], \ldots, V[i_{x-1}]\}$.

Figure 5:
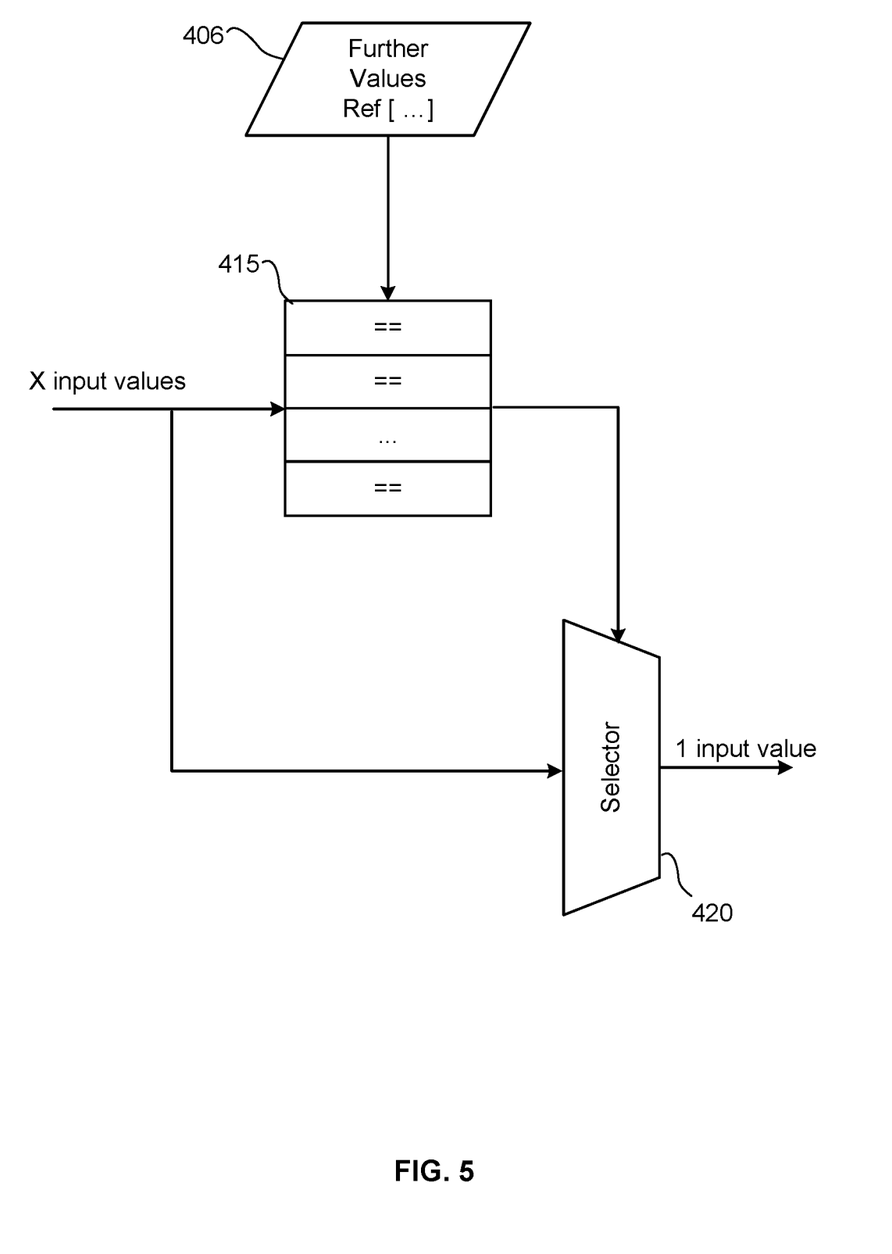
FIG. 5 is a block diagram showing a system for selecting input values for processing by ANN computations, according to an example embodiment.

FIG. 5 is a block diagram showing a controller 415, according to some example embodiments. Upon receiving the set $\{V[i_0], V[i_1], \ldots, V[i_{x-1}]\}$ of X input values of the data, the controller 415 can compare the input values to reference value(s) (ref). The reference value(s) can be included in the further values 406. In some embodiments, the controller 415 may not use the further values 406. In some embodiments, the reference value(s) can be equal to zero. Based on the result of the comparison, the controller 415 may provide the selector 420 with one or more index(es) of the input value to be selected. In other embodiments, the controller 415 can perform a selection of an input value based on different criteria. In some embodiments, one or multiple input values 405 and multiple further values 406 can be used for the selection. In certain embodiments, other selection operations could be done involving one or multiple X input values 405 or one or multiple further values 406. For example, the input value may be selected if the input value is less than a threshold.

Referring back to FIG. 4, the selector 420 may receive the set of input values $\{V[i_0], V[i_1], \ldots V[i_{x-1}]\}$ and the indication from the controller 415 as to which of the input values to select. The selector 420 may select a value V[i] and provide the selected input value V[i] to the arithmetic unit 425. The information of the selected input value may be represented in any form. In some embodiments, the controller 415 and the selector 420 may be carried out as a single unit configured to perform functionalities of both controller 415 and selector 420. In further embodiments, the selector 420 can be also configured to select weights 410 based on indications from the controller 415.

The arithmetic unit 425 can be configured to compute sums, multiplications, accumulations, or other operations. The arithmetic unit 425 may receive the selected value V[i] from the selector 420 and the offset of index of selected value V[i] from the controller 415. The arithmetic unit 425 may be further configured to select, based on the offset, a weight W[i] corresponding to value V[i]. The arithmetic unit 425 may further determine product V[i]×W[i] and add the product to corresponding sum. Because the multiplication is performed only for selected values of data and selected weights, the computation of sum, and hence computation of the ANN, can be accelerated. In some embodiments, the arithmetic unit 425 can determine products V[j]×W[k], wherein j and k are determined based on the input values 405, further input values 406, and the weights 410 specified by the controller 415. In some embodiments, the arithmetic unit 425 can perform further mathematical operations different from products and sums, independently, prior to, or after performing the products or sums.

Figure 6:
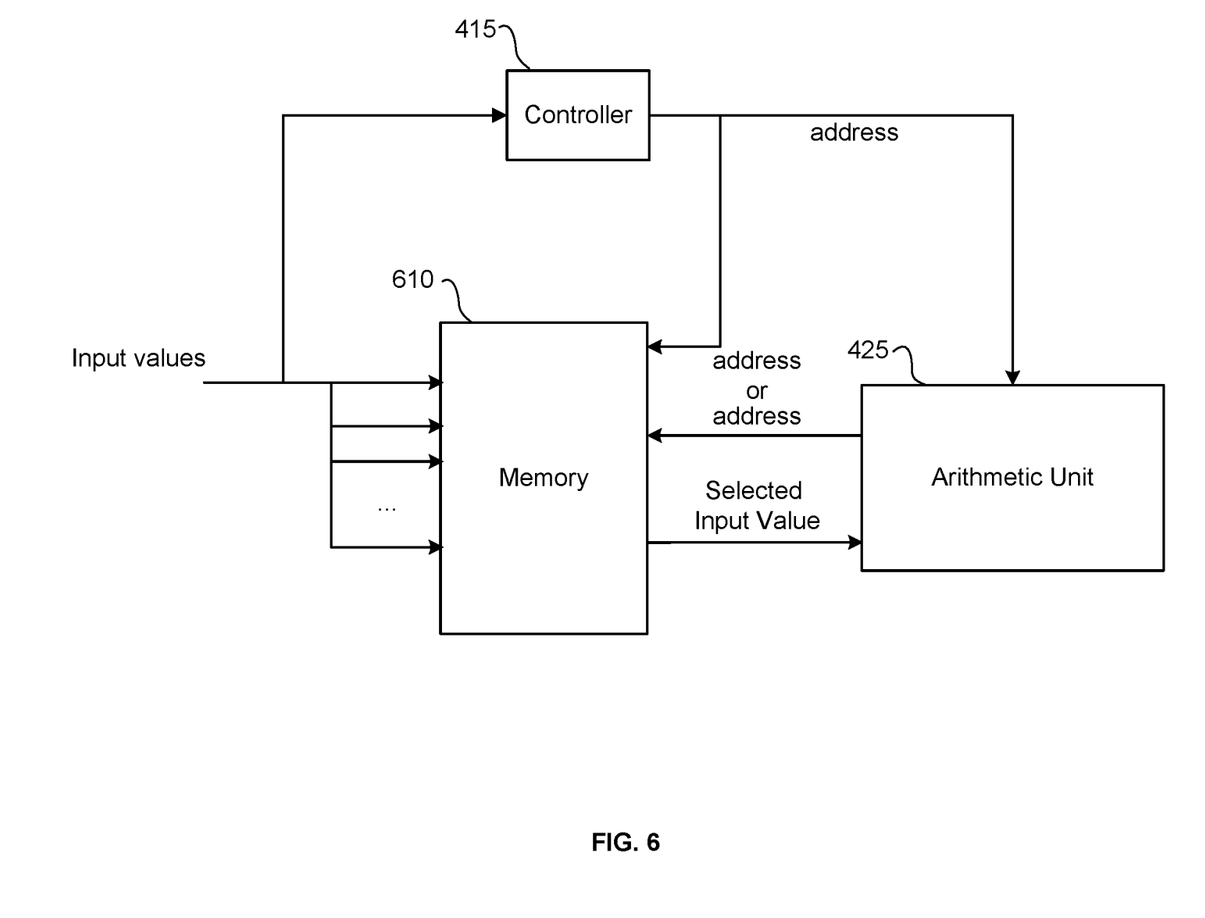
FIG. 6 is a block diagram showing a system for selecting input data for processing by ANN computations, according to another example embodiment.

FIG. 6 is a block diagram showing a system 600 for selecting input values to be processed in an ANN computation, according to another example embodiment. The system may include a controller 415, an arithmetic unit 425, and a memory 610. The memory 610 can be configured to store a set of X input values {V[$i_0$], V[$i_1$], ... V[$i_{x-1}$]}. The controller 415 can be configured to determine an address of an input value to be selected for multiplication in arithmetic unit 425. The arithmetic unit 425 may read the selected input value based on the address received from the controller 415.

Figure 7:
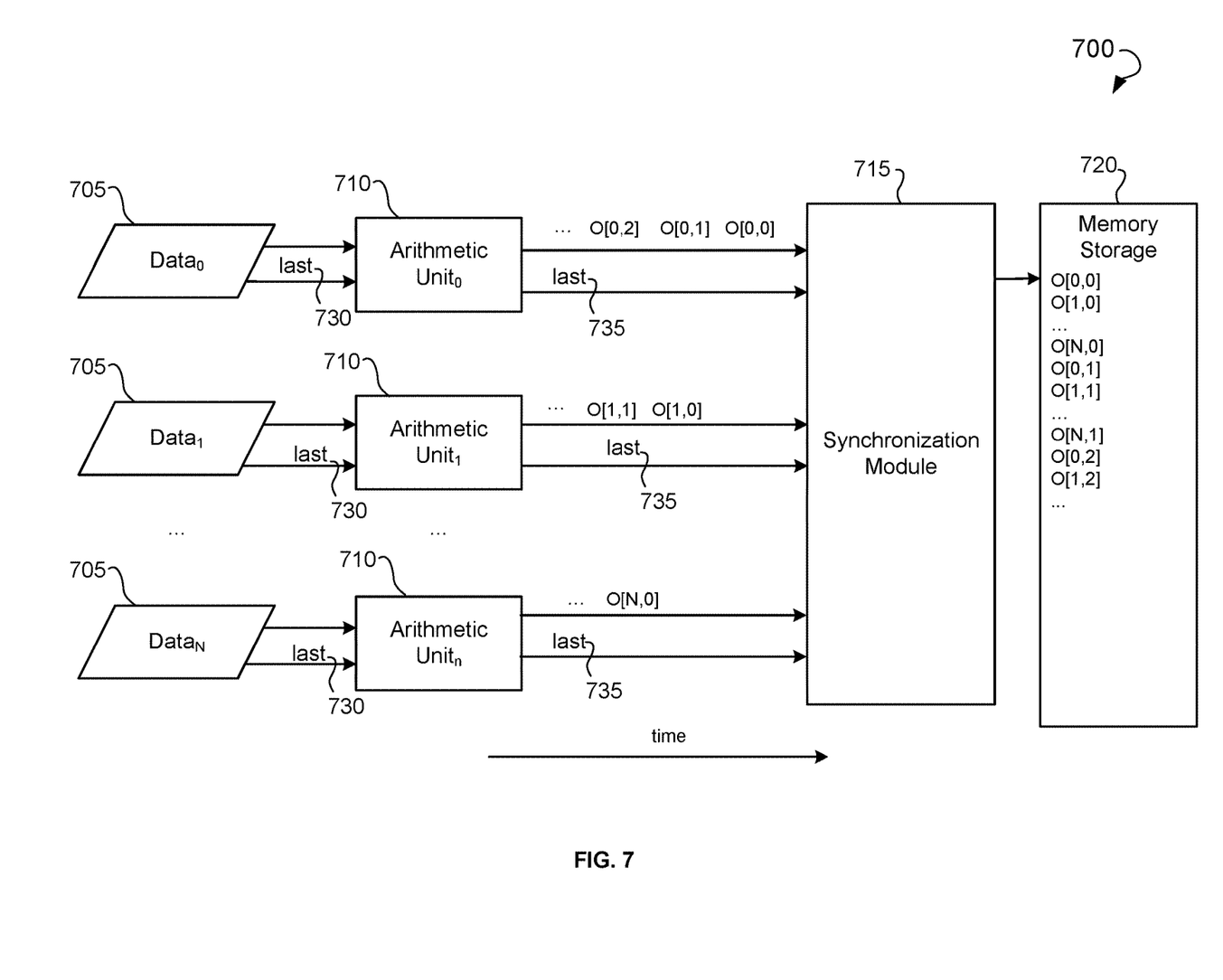
FIG. 7 is a block diagram showing a system for synchronization of outputs of neurons in ANN computations, according to another example embodiment.

FIG. 7 is a block diagram showing a system 700 for synchronization of results of parallel calculations of neurons in the ANN, according to an example embodiment. The system 700 may include arithmetic units 710, a synchronization module 715, and a memory 720.

The arithmetic units 710 can process input values of different data 705. The data 705 can be related to each other or be in part or generally the same input data. For example, in the computation of the ANN trained to recognize objects in color images, the data 705 may represent red, green, and blue color components of the color images. In another example, in computations of the ANN the data 705 may represent input values from different receptive fields selected by filters. Because the amount of input values selected for processing by different arithmetic units 710 can be different, arithmetic units 710 may finish processing of the input data at different rates. Therefore, results of neuron computations (performed in parallel) within a layer of the ANN can be unaligned.

For example, $data_0$ and $data_1$ of the data 705 may include equal numbers of input values. However, the number and indexes of input values selected from $data_0$ to compute i-th neuron output by a first arithmetic unit of the arithmetic units 710 can be different from the number and indexes of input values selected from $data_1$ to compute i-th neuron output by a second arithmetic unit of the arithmetic units 710. Due to the differences in the numbers of selected input values and the indexes of the selected input values, either 1) i-th neuron output of the first arithmetic unit can be generated substantially prior to an i-th neuron output of the second arithmetic unit; or 2) the i-th neuron output of the first arithmetic unit can be generated substantially after the i-th neuron output of the second arithmetic. Therefore, a first stream of neuron outputs from the first arithmetic unit can be substantially unaligned with a second stream of neuron outputs from the second arithmetic unit even when the first arithmetic unit and the second arithmetic unit are configured to process the $data_0$ and $data_1$ in parallel. The first stream of neuron outputs and the second stream of neuron outputs can also be unaligned due to the difference in the number of neuron outputs from the first arithmetic unit and the second arithmetic unit because the first arithmetic unit and the second arithmetic unit can be configured to generate different numbers of neuron outputs based on the same number of input values.

The synchronization module 715 can be configured to re-align outputs from arithmetic units 710. The synchronization module can receive neuron outputs from arithmetic units 710, one neuron output at time, and write the neuron outputs to memory storage 720, in proper order. In some embodiments, the synchronization module 715 may receive partial results of neurons or multiple results of different neurons. In example of FIG. 1, the synchronization module 715 may receive neuron outputs O[0,i] (i=1, ..., last) from the first of the arithmetic units, neuron outputs O[1,i] (i=1, ..., last) from the second of the arithmetic units, and so on. The neuron outputs may be received by the synchronization module 715 in an unordered time sequence O[0,0], O[0,1], O[1,0], O[0,2], O[1,1], .... The synchronization module 715 can write the neuron outputs in a proper order: O[0,0], O[1,0], ..., O[N, 0], O[0,1], O[1,1], ..., O[N,1], O[0,2], O[1,2], .... Thus, the neuron outputs can be read in a proper order as inputs for neurons at further layer(s) of the ANN. Data 705 may include labels 730 indicating the last input value of the stream for input values. The arithmetic units 710 can be configured to send, to the synchronization module 715, an indication 735 that the last part of the input data is being processed. Upon receiving the indication 735, the synchronization module 715 may finish writing neuron output to memory storage 720 and stand by ready for the next series of neuron outputs. In some embodiments, the indication 730 can be indicative of the first part of a new input data being processed rather than the last part of the input data. In another embodiment, the indication may include a number of input values to be processed. The indication can be part of the data or a separate information, as shown on FIG. 7 with marks 730 and 735.

Figure 8:
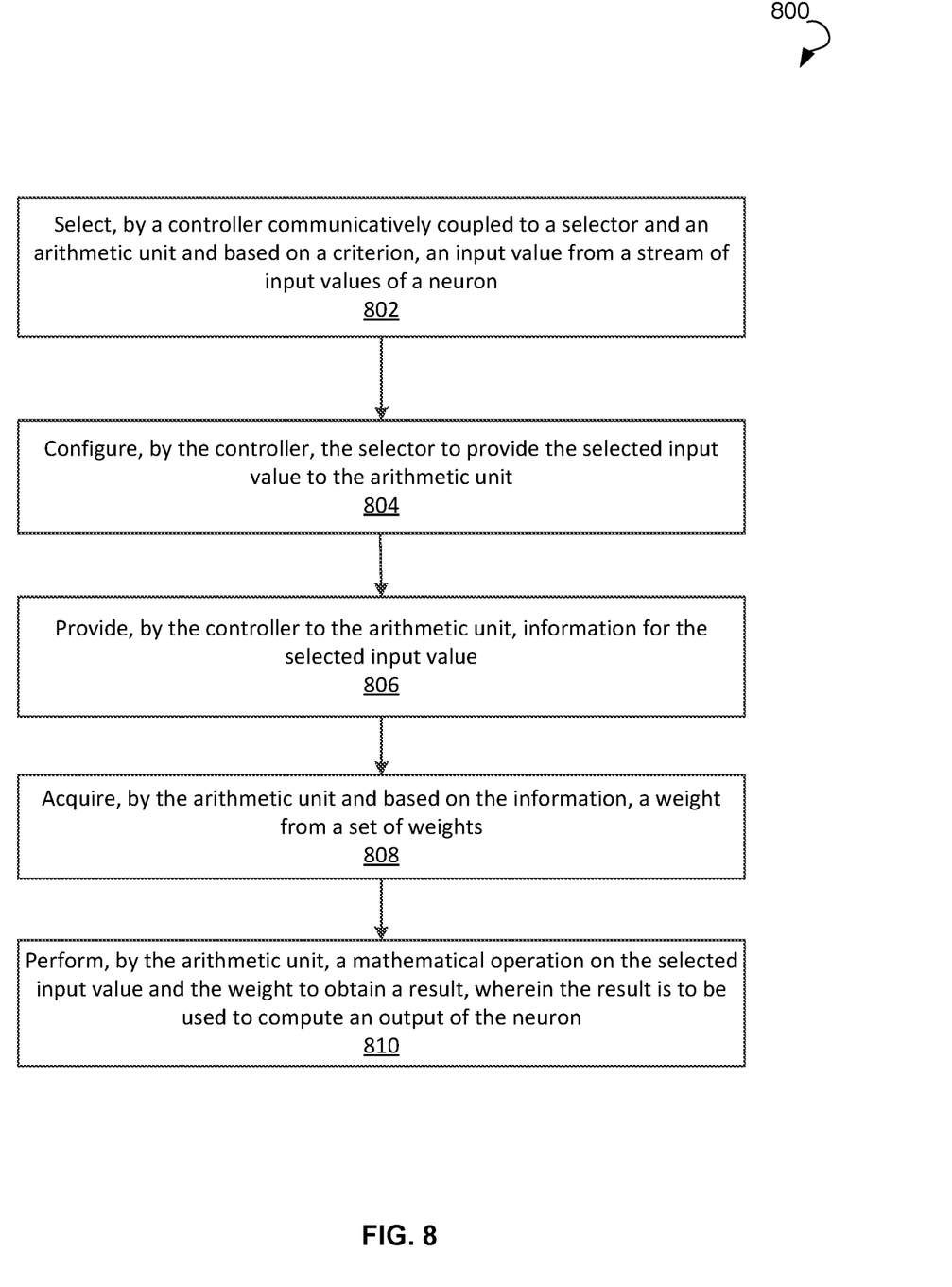
FIG. 8 is a flow chart showing steps of a method for acceleration of ANN computations, according to some example embodiments.

FIG. 8 is a flow chart illustrating a method 800 for accelerating of ANN computations, in accordance with some example embodiments. In some embodiments, the operations may be combined, performed in parallel, or performed in a different order. The method 800 may also include additional or fewer operations than those illustrated. The method 800 may be performed by system 100 described above with reference to in FIG. 1.

In block 802, the method 800 may select, by a controller communicatively coupled to a selector and an arithmetic unit and based on a criterion, an input value from a stream of input values of a neuron. The controller can be configured to select input values by comparison of the input values to a reference value. The reference value can be equal to zero. In block 804, the method 800 may configure, by the controller, the selector to provide the selected input value to the arithmetic unit.

In block 806, the method 800 may provide, by the controller, to the arithmetic unit, information for the selected input value. The information may include an offset of the selected input values in the stream. In block 808, the method 800 may acquire, by the arithmetic unit and based on the information, a weight from a set of weights. In block 810, the method 800 may perform, by the arithmetic unit, a mathematical operation on the selected input value and the weight to obtain a result, wherein the result is to be used in computing an output of the neuron. For example, the arithmetic unit may determine a multiplication product of the selected input values and weight, and summate the multiplication product into a sum. A count of the input values in the stream may be greater than a count of mathematical operations performed by the arithmetic units, wherein the operations are performed on the input values selected from the stream.

Figure 9:
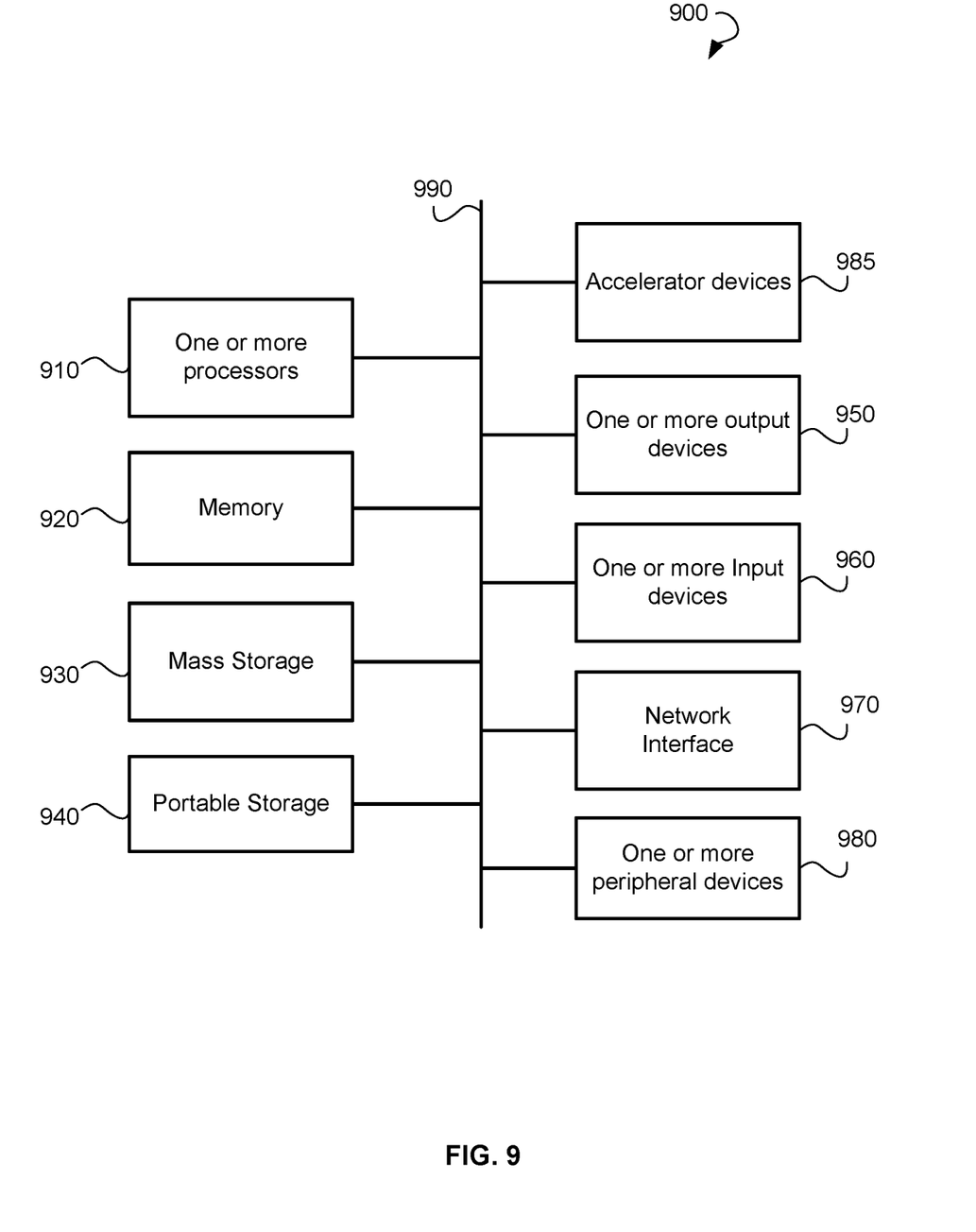
FIG. 9 shows a computing system that can be used to implement embodiments of the disclosed technology.

FIG. 9 illustrates an example computing system 900 that may be used to implement embodiments described herein. The example computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The processor 910 may include internal accelerators like a graphical processing unit, a Field Programmable Gate Array, or similar accelerators that may be suitable for use with embodiments described herein. The memory 920 may include internal accelerators like a graphical processing unit, a Field Programmable Gate Array, or similar accelerators that may be suitable for use with embodiments described herein. The example computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more input/output buses.

Mass storage 930, which may be implemented with a magnetic disk drive, an optical disk drive or a solid state drive, is a non-volatile storage device for storing data and instructions for use by a magnetic disk, an optical disk drive or SSD, which in turn may be used by one or more processors 910. Mass storage 930 can store the system software for implementing embodiments described herein for purposes of loading that software into memory 920. The mass storage 930 may also include internal accelerators like a graphical processing unit, a Field Programmable Gate Array, or similar accelerators that may be suitable for use with embodiments described herein.

Portable storage 940 may operate in conjunction with a portable non-volatile storage medium, such as a compact disk (CD) or digital video disc (DVD), to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The example computing system 900 of FIG. 9 may also include one or more accelerator devices 985. The accelerator devices 985 may include PCIe-form-factor boards or storage-form-factor boards, or any electronic board equipped with a specific electronic component like a Graphical Processing Unit, a Neural Processing Unit, a Multi-CPU component, a Field Programmable Gate Array component, or similar accelerators electronic or photonic components, that may be suitable for use with embodiments described herein.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for accelerating ANN computations are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for accelerating artificial neural network (ANN) computations, the system comprising:
 a controller;
 a selector communicatively coupled to the controller; and
 an arithmetic unit communicatively coupled to the controller and the selector; and wherein:
  the controller is configured to:
   select an input value, based on a criterion, from a subset of input values of a neuron, wherein the criterion is based on a comparison of the input value to a further value, the further value being different from the input value and being dynamically provided to the controller, the further value being related to one of the following: the neuron, a layer of the ANN, the ANN, weights of the ANN, and an operation carried by the arithmetic unit;
   cause, based on the further value, the selector to provide dynamically the selected input value to the arithmetic unit; and
   provide, to the arithmetic unit, an offset of an index of the selected input value in the subset of input values, wherein the offset is based on the further value, the further value being indeterminable based on the offset; and
  the arithmetic unit is configured to:
   acquire, based on the offset of the index of the selected input value, a weight from a set of weights, the weight corresponding to the selected input value; and
   perform a mathematical operation on the selected input value and the weight to obtain a result, wherein the result is to be used to compute an output of the neuron.

2. The system of claim 1, wherein the mathematical operation includes a multiplication product.

3. The system of claim 1, wherein the criterion includes a comparison between an input value and a reference value.

4. The system of claim 3, wherein the reference value is zero.

5. The system of claim 1, wherein the selector includes a multiplexor.

6. The system of claim 1, wherein the selector includes information associated with a memory address of the selected input value.

7. The system of claim 1, wherein:
 input values unselected from the subset of input values are not provided to the arithmetic unit.

8. The system of claim 1, wherein a count of mathematical operations performed by the arithmetic unit on selected input values from the subset of input values is less than a count of mathematical operations required to be performed by the arithmetic unit on all input values from the subset of the input values.

9. The system of claim 1, wherein the selecting the input value is based on a value of at least one weight from the set of weights.

10. A method for accelerating artificial neural network (ANN) computation, the method comprising:
 selecting, by a controller communicatively coupled to a selector and an arithmetic unit and based on a criterion, an input value from a subset of input values of a neuron, wherein the criterion is based on a comparison of the input value to a further value, the further value being different from the input value and being dynamically provided to the controller, the further value being related to one of the following: the neuron, a layer of the ANN, the ANN, weights of the ANN, and an operation carried by the arithmetic unit;
 causing, by the controller, based on the further value, the selector to provide dynamically the selected input value to the arithmetic unit; and
 providing, by the controller to the arithmetic unit, an offset of an index of the selected input value in the subset of input values, wherein the offset is based on the further value, the further value being indeterminable based on the offset;
 acquiring, by the arithmetic unit and based on the offset of the index of the selected input value, a weight from a set of weights, the weight corresponding to the selected input value; and
 performing, by the arithmetic unit, a mathematical operation on the selected input value and the weight to obtain a result, wherein the result is to be used to compute an output of the neuron.

11. The method of claim 10, wherein the mathematical operation includes a multiplication product.

12. The method of claim 10, wherein the criterion includes a comparison between the input value and a reference value.

13. The method of claim 12, wherein the reference value is zero.

14. The method of claim 10, wherein:
 input values unselected from the subset of input values are not provided to the arithmetic unit.

15. The method of claim 10, wherein the selector includes a multiplexor.

16. The method of claim 10, wherein the selector includes information associated with a memory address of the selected input value.

17. The method of claim 10, wherein a count of mathematical operations performed by the arithmetic unit on selected input values from the subset of input values is less than a count of mathematical operations required to be performed by the arithmetic unit on all input values from the subset of the input values.

18. The method of claim 10, wherein the selecting the input value is based on a value of at least one weight from the set of weights.

* * * * *